Nov. 5, 1957 H. WURZEL 2,811,889
INTERNAL RETAINING RING HAVING INTEGRAL LOCKING PRONG
Filed June 18, 1954 2 Sheets-Sheet 1

INVENTOR
HUGO WURZEL
BY
ATTORNEY

INVENTOR
HUGO WURZEL
ATTORNEY

United States Patent Office 2,811,889
Patented Nov. 5, 1957

2,811,889

INTERNAL RETAINING RING HAVING INTEGRAL LOCKING PRONG

Hugo Wurzel, Bronx, N. Y., assignor to Waldes Kohinoor, Inc., Long Island City, N. Y., a corporation of New York Application June 18, 1954, Serial No. 437,730

1 Claim. (Cl. 85—8.8)

This invention relates to improvements in internal retaining rings, and more particularly to an improved internal retaining ring incorporating integral means for securing itself against accidental or unintentional removal from its groove.

As is well known, internal retaining rings having the form of an open-ended annulus made of spring metal are adapted, when sprung into a groove provided therefor in the bore of a housing or the like, to provide an artificial shoulder serving to locate a machine part against axial displacement within the bore. Because such rings are designed to seat against the bottom of their grooves with substantial pressure, they are inherently self-locking to a degree that in the normal retaining ring assembly extraneous ring locking means are not required.

However, as explained in my prior application Serial No. 432,164, filed May 25, 1954, there are certain ring assemblies employing the internal retaining ring as aforesaid wherein, under unfavorable conditions, the ring may contract, as permitted by the gap provided between its open ends, in an uncontrolled manner, such making it possible for the ring accidentally to jump or be driven from its groove, with serious consequences to the ring and/or to the assembly as a whole. While the ring locking means disclosed and claimed in my prior application aforesaid provides a simple and foolproof solution for the problem, nevertheless such locking means is open to the objection that it comprises a part in the form of a spring locking clip which is physically separate from and is assembled and disassembled independently of the retaining ring for which it serves as the locking means.

Accordingly, a principal object of the present invention is the provision of an internal retaining means incorporating as an integral part thereof locking means capable of effectively locking said ring against accidental or unintentional removal from its groove, even under the most unfavorable operating conditions.

More particularly, it is an object of this invention to provide an internal retaining ring having integral means for positively preventing unintentional or accidental contraction of said ring, as can result in the ring jumping or being driven from its groove.

Yet another object of the invention is the provision of an internal retaining ring incorporating integral means serving the purpose of the invention as aforesaid, which means is further characterized by being readily manipulatable to a position in which it becomes ineffective to prevent contraction of the ring, thus permitting the latter to be intentionally contracted as when disassembly is desired.

Still another object of the invention is the provision of an internal retaining ring carrying its own means for securing itself against unintentional or accidental removal from its seating groove, and wherein said means preferably has the form of a prong extending integrally from one end of the ring towards the other end so as normally to bridge the gap between said ends and thereby prevent contraction of the ring, said prong being moreover so fashioned and dimensioned that it may be bent elastically out from the plane of the ring so as to clear said other ring end, as required to contract the ring, for example, when its disassembly is desired.

Yet a further object is the provision of an internal retaining ring in the form of an open-ended annulus whose free ends are formed as lugs having apertures for the reception of the working tips of plier-like contracting and handling tools, and which is characterized by a locking prong extending integrally from one end lug towards the other end lug so as normally to bridge the gap between the ring ends, wherein the aperture in said other end lugs is spaced from the corresponding ring end a distance substantially equal to the arcuate length of the prong, as necessary to enable the prong to lap said other end of the ring in the intentional contraction thereof by a tool as aforesaid.

A more specific object of the invention is the provision of an internal retaining ring having integral means for locking the ring in its groove, characterized by simple, inexpensive yet rugged construction, and by a high degree of dependability in its action.

The above and other objects and features of advantage of an internal retaining ring carrying its own locking means according to the present invention will appear from the following detailed description thereof, taken with the accompanying drawings illustrating a specific example of such a ring and its locking means, in which.

Figure 4:
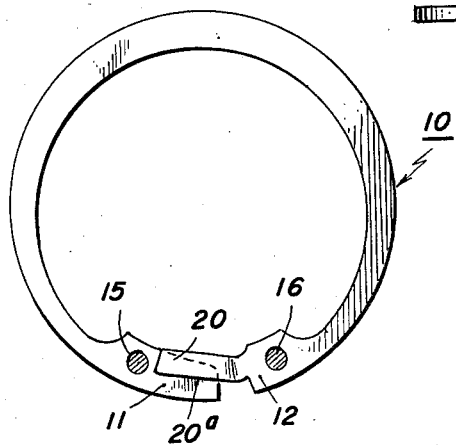
Fig. 4 is a view similar to Fig. 1 but illustrating the ring fully contracted as during assembly or disassembly thereof.
Figure 5:
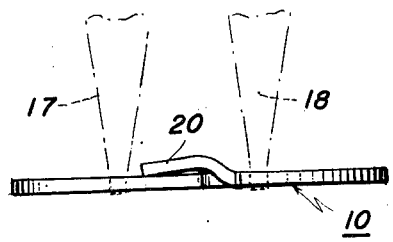
Fig. 5 is a bottom edge view of the contracted ring shown in Fig. 4, the view further illustrating the tips of the pliers employed to contract the ring.
Figure 6:
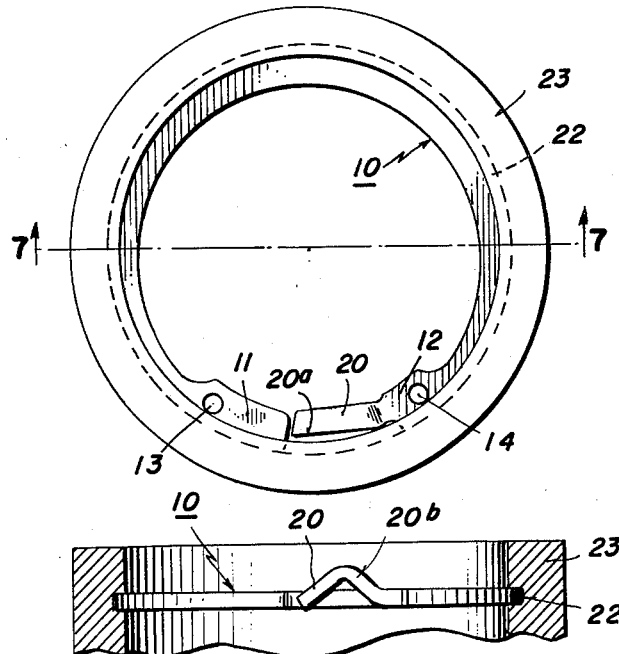
Fig. 6 is a view looking into an end of an internal retaining ring assembly incorporating the internal retaining ring and its locking means as illustrated in Fig. 1.
Figure 9:
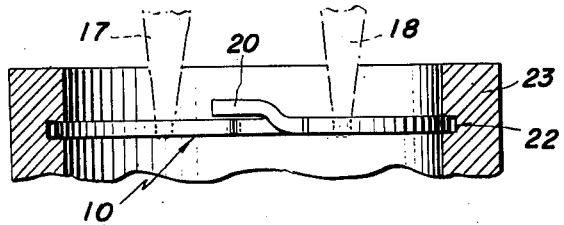
Fig. 9 is a section similar to Fig. 7, further illustrating the position of the locking means.
Figure 8:
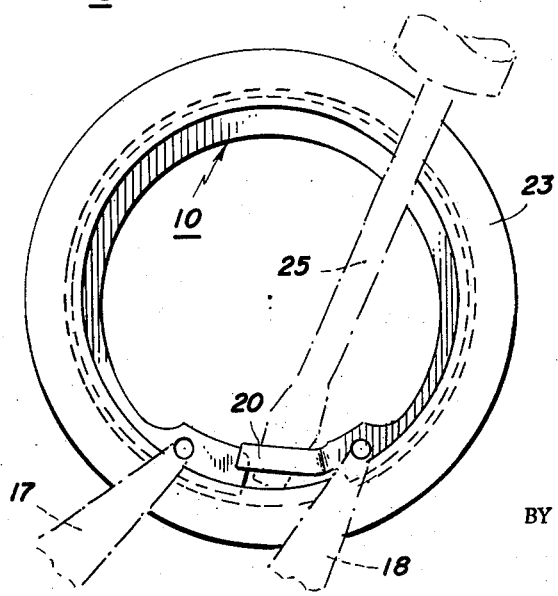
Fig. 8 is a view similar to Fig. 6, illustrating the manner in which the ring locking means may be disabled when intentional contraction of the ring is desired, as in its disassembly.

Referring to the drawings, reference numeral 10 generally designates an internal spring retaining ring provided with integral locking means according to the present invention, said ring comprising an open-ended ring body or annulus made of spring metal, whose ends are formed as lugs 11, 12 which are provided, as usual, with apertures 13, 14 for the reception of the working points 15, 16 (Fig. 4) of a plier-like tool for handling such rings, whose tips or jaws 17, 18 are generally indicated in Figs. 5, 8 and 9. As the illustrated ring is of the internal type, the lugs 11 and 12 are inwardly directed so that the ring body has a continuous groove-seating outer edge 10a. Also it will be observed that the illustrated ring is of the so-called tapered type, characterized in that the section heights of the ring body decrease from its middle section towards its free ends, whereby the ring deforms circularly and hence, when properly dimensioned to its groove, has pressure fit all around against the bottom thereof when assembled as shown in Fig. 6.

While in the normal ring assembly this pressure fit of ring against groove bottom is such as to secure the ring against unintentional removal from its groove, it is possible, under certain conditions, for the ring to contract in uncontrolled manner and thereupon to jump or be driven from its groove. To safeguard against this possibility, the aforesaid locking means is provided and such comprises a prong-like extension 20 (hereinafter for convenience designated a "locking prong"), which projects integrally from one end lug, such as the end lug 12, toward the other end lug 11 and in substantial circumferential continuation of the ring body. As best seen in Fig. 6, the length of the locking prong 20 is such that, when the ring is contracted consequent to its assembly in a groove 22 opening into the bore of a housing 23 or similar carrying part, it fills, or substantially fills, the gap between the open ends of the ring and thus prevents unintentional further contraction of the ring to a diameter that would enable it to free itself from said groove. Thus, it will be seen that the integral locking prong 20 provides a simple and foolproof means for locking an internal retaining ring in its groove. Moreover, being integral with the ring for which it serves as a locking or securing means, it overcomes the disadvantage of prior clip-type ring-to-groove locking means which are assembled and disassembled separately from the ring.

Figure 1:
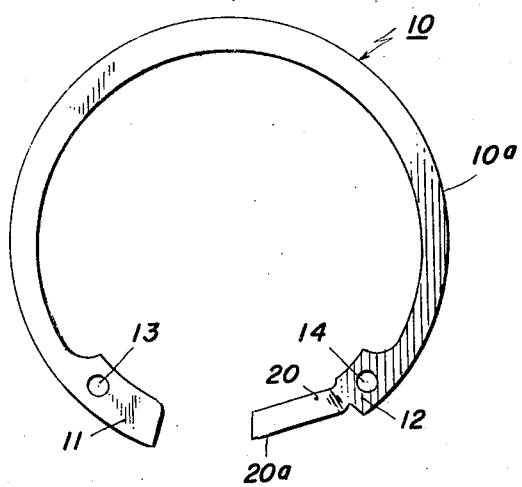
Fig. 1 is a plan view of the internal retaining ring and its locking means as aforesaid, the ring being illustrated in its unstressed state.
Figure 3:
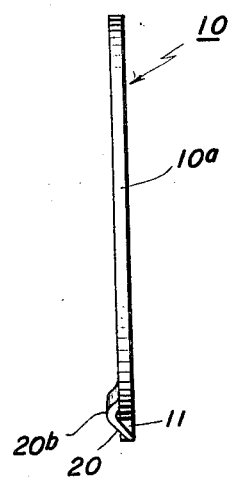
Figs. 2 and 3 are bottom- and right-edge views, respectively, of the ring illustrated in Fig. 1.
Figure 2:
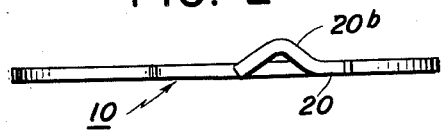
Figure 7:
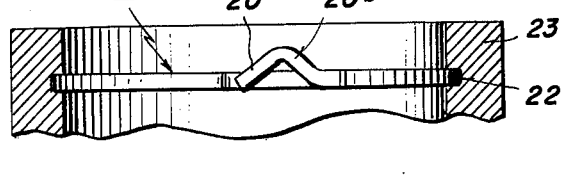
Fig. 7 is a section taken along line 7—7 of Fig. 6, the retaining ring being fully shown as in Fig. 2.

To enable the ring to be contracted to a smaller diameter than that which it assumes when seated in its groove, as required for example in moving the ring into the housing bore preliminary to seating it in said groove, and also in intentionally contracting the ring as is necessary to lift it from its groove in disassembling same, the locking prong is specially dimensioned and formed as follows: In the first place, its outer edge, designated 20a, is offset radially inwardly from the outer or groove-seating edge 19a of the retaining ring body by at least the depth of the housing groove 21. Such permits the free end of the locking prong to flex laterally out of the plane of the ring, without interference from the side walls of the groove. Secondly, so as to impart substantial resilience to the free end of the locking prong thereby to permit it to spring or bend elastically out of its plane and thereupon to return to its plane, said prong is reversely bent or "humped" intermediate its ends as at 20b (Fig. 2), such insuring that, following any substantial contraction of the ring during which the free end of the locking prong is bent laterally out of the plane of and slid along the adjacent surface of the end lug 11, said free end tends to return to the plane of the ring immediately upon it being free to do so, thus to reassume its normal locking position as shown in Figs. 6 and 7.

The aforesaid hump 20b also serves the very useful purpose of enabling the point or blade of a tool such as a screw driver generally indicated at 25 (Fig. 8) to be inserted in the concavity formed in the locking prong 20 opposite said hump and thereupon to spring the locking prong out of the plane of the ring. When so acted upon by a screw driver, the locking prong is in effect disabled, whereupon the ring may be intentionally contracted by causing the plier working points 15, 16 inserted into the end-lug apertures 13, 14 of the ring to move together in the usual manner.

To enable the locking prong 20 when disabled as in Fig. 8 to ride over or lap the end lug 11 of the ring the amount permitting the ring to be fully contracted as in Fig. 4, said end lug is formed with increased arcuate length as compared to the normal length of such an end lug, as represented by the length of the end lug 12, and its aperture 13 is set back so as to be circumferentially spaced from the corresponding free end of the ring a distance corresponding substantially to the length of said locking prong. Accordingly, when inserted in said aperture 13, the point 15 of the tool tip 17 provides no interference to movement of the locking prong 20 along the end lug as the ring is contracted, with the result that controlled ring contraction may proceed up to the maximum permissible contraction, as indicated in Figs. 4 and 5, for example.

Without further analysis, it will be seen that, in addition to the locking prong 20 providing a simple and effective means integral with an internal retaining ring for locking said ring against unintentional or accidental removal from its groove, as aforesaid, said locking prong is further so dimensioned and fashioned that it may be disabled or rendered ineffective when intentional contraction of the ring is desired, for example, in moving the ring into the housing bore preliminary to assembling it in its groove, and when disassembling the ring from its groove. Such disabling action may be simply achieved and without in any way impairing the further action of the locking prong in the continued use of the retaining ring.

As many changes could be made in carrying out the above construction without departing from the scope of the invention, it is intended that all matter contained in the above description or shown in the accompanying drawings shall be interpreted as illustrative and not in a limiting sense.

I claim:

An internal retaining ring adapted to be sprung into a groove provided therefor in the bore of a housing and to form therein a shoulder for preventing axial displacement of a machine part mounted in said bore, said retaining ring comprising an open-ended ring body having a gap between its free ends and said free ends being formed as lugs having apertures for the reception of the tips of a plier-like tool by which the ring may be contracted in its assembly and/or disassembly, one end lug carrying an integral prong disposed generally in the plane of the ring body and extending in substantial circumferential continuation of said ring body into said gap a distance corresponding substantially to the width of the gap when the ring is contracted the amount to seat in said groove with spring pressure and being adapted to abut the other end lug upon the seated ring tending to contract a greater amount, said prong having lateral resilience whereby it may flex out of the plane of the ring body and hence move to a side of said other end lug during assembly and disassembly of the ring in said groove, the outer edge of said prong being offset radially inwardly from the outer edge of said ring body by an amount at least equaling the depth of said groove whereby to permit the prong to be freely flexed as aforesaid without interference from the side walls of the groove, said prong being formed with an axially directed hump intermediate its ends providing a cavity for the insertion of a tool for bending the prong out of the plane of the ring body, said other lug being substantially elongated as compared to said one end lug, and the aperture in said elongated end lug being set back from the end edge thereof a distance corresponding substantially to the length of the locking prong.

References Cited in the file of this patent

UNITED STATES PATENTS

| 1,767,217 | Kraft | June 24, 1930 |
| 2,574,034 | Heimann | Nov. 6, 1951 |
| 2,595,787 | Heimann | May 6, 1952 |

FOREIGN PATENTS

| 349,329 | Great Britain | May 28, 1931 |
| 662,321 | Great Britain | Dec. 5, 1951 |